United States Patent
Yang

(10) Patent No.: US 10,694,865 B2
(45) Date of Patent: Jun. 30, 2020

(54) FOLDABLE ENCLOSURE APPARATUS HAVING A LOCKING DEVICE FOR A BABY BED

(71) Applicants: Shu-Chen Wang, GuangDong (CN); Sunnylove Baby Products Zhuhai Co., Ltd., Zhuhai, Guangdong Province (CN)

(72) Inventor: Cheng-Fan Yang, Tainan (TW)

(73) Assignee: SUNNYLOVE BABY PRODUCTS ZHUHAI CO., LTD., Zhuhai, Guangdong Province (CN)

( * ) Notice: Subject to any disclaimer, the term of this patent is extended or adjusted under 35 U.S.C. 154(b) by 581 days.

(21) Appl. No.: 15/602,750

(22) Filed: May 23, 2017

(65) Prior Publication Data

US 2018/0008056 A1    Jan. 11, 2018

(30) Foreign Application Priority Data

Jul. 9, 2016    (CN) .......................... 2016 1 0543401

(51) Int. Cl.
| | |
|---|---|
| *A47D 9/00* | (2006.01) |
| *A47D 13/06* | (2006.01) |
| *F16B 12/10* | (2006.01) |
| *F16B 7/14* | (2006.01) |
| *A47D 7/00* | (2006.01) |
| *F16B 7/10* | (2006.01) |
| *E04G 7/00* | (2006.01) |

(52) U.S. Cl.
CPC ............ *A47D 9/005* (2013.01); *A47D 7/002* (2013.01); *A47D 13/06* (2013.01); *A47D 13/061* (2013.01); *A47D 13/063* (2013.01); *F16B 7/105* (2013.01); *F16B 7/14* (2013.01); *F16B 12/10* (2013.01); *E04G 7/00* (2013.01); *Y10T 292/03* (2015.04); *Y10T 292/1028* (2015.04)

(58) Field of Classification Search
CPC ...... A47D 9/005; A47D 13/063; A47D 7/002; A47D 13/06; A47D 13/061; F16B 12/10; F16B 7/105; F16B 7/14; E04G 7/00; Y10T 292/1028; Y10T 292/03
USPC .......................................................... 5/99.1
See application file for complete search history.

(56) References Cited

U.S. PATENT DOCUMENTS

| | | | | |
|---|---|---|---|---|
| 4,645,183 | A * | 2/1987 | Rattray ................ | A47D 13/063 256/25 |
| 5,213,094 | A * | 5/1993 | Bonutti ................. | A61F 5/0123 601/33 |
| 5,241,716 | A * | 9/1993 | Kohus .................. | A47D 13/063 16/354 |
| 6,001,075 | A * | 12/1999 | Clemens ............... | A61F 5/0123 602/16 |

(Continued)

*Primary Examiner* — Nicholas F Polito
*Assistant Examiner* — Luke Hall
(74) *Attorney, Agent, or Firm* — Thomas J. Nikolai; DeWitt LLP

(57) ABSTRACT

A foldable enclosure apparatus has a hub device, four lower assemblies, four upper assemblies, and at least one locking device. The lower assemblies are foldable and are pivotally mounted around the hub device. Each upper assembly is foldable and is mounted between two adjacent lower assemblies of the four lower assemblies. The at least one locking device is mounted with the corresponding lower assembly and the corresponding upper assembly for locking or unlocking the upper assemblies.

20 Claims, 11 Drawing Sheets

(56) References Cited

U.S. PATENT DOCUMENTS

| | | | | |
|---|---|---|---|---|
| 6,485,216 B1* | 11/2002 | Cheng | ............... | B62B 7/06 |
| | | | | 280/47.36 |
| 6,510,568 B1* | 1/2003 | Drobinski | ............... | A47D 7/002 |
| | | | | 5/93.1 |
| 6,729,791 B1* | 5/2004 | Chen | ............... | A47D 13/063 |
| | | | | 403/102 |
| 7,552,487 B2* | 6/2009 | Chen | ............... | A47D 13/063 |
| | | | | 248/292.12 |
| 7,752,688 B2* | 7/2010 | Chen | ............... | A47C 31/023 |
| | | | | 403/102 |
| 7,950,081 B2* | 5/2011 | Chen | ............... | A47D 13/063 |
| | | | | 5/93.1 |
| 7,958,578 B2* | 6/2011 | Shan | ............... | A47D 7/04 |
| | | | | 5/655 |
| 8,522,375 B2* | 9/2013 | Conrad | ............... | A47D 9/00 |
| | | | | 5/93.1 |
| 8,656,530 B2* | 2/2014 | You | ............... | A47D 7/03 |
| | | | | 5/93.2 |
| 8,966,679 B2* | 3/2015 | Mendes | ............... | A47D 13/061 |
| | | | | 5/93.1 |
| 9,681,713 B2* | 6/2017 | Pao | ............... | A45B 5/00 |
| 2007/0017025 A1* | 1/2007 | Myer | ............... | A47D 7/002 |
| | | | | 5/99.1 |
| 2008/0235867 A1* | 10/2008 | Chen | ............... | A47D 7/02 |
| | | | | 5/93.1 |

\* cited by examiner

FOLDABLE ENCLOSURE APPARATUS HAVING A LOCKING DEVICE FOR A BABY BED

BACKGROUND OF THE INVENTION

1. Field of the Invention

The present invention relates to a foldable enclosure apparatus having a locking device for a baby bed, and more particularly to a foldable enclosure apparatus that has the locking device for enhancing the safety.

2. Description of Related Art

A conventional foldable enclosure apparatus for a baby bed has a hub device, four lower assemblies, and four upper assemblies. The lower assemblies are foldable and are pivotally connected to and mounted around the hub device at spaced intervals. The upper assemblies are connected to and surround the hub device in a rectangular shape. Each upper assembly is foldable and is mounted between two adjacent lower assemblies. Each upper assembly has a connecting seat and two upper rods. The connecting seat is located between the two adjacent lower assemblies. An end of each upper rod is pivotally mounted on a corresponding one of the lower assemblies. Another end of each upper rod is pivotally mounted on the connecting seat and forms a gear portion. The gear portions of the two upper rods engage with each other.

The conventional foldable enclosure apparatus can be folded. In use, the hub device is pulled for driving the lower assemblies to rotate, and then the upper assemblies are driven by the rotation of the lower assemblies to be folded with the lower assemblies.

As the gear portions of two upper rods of each upper assembly engage with each other, the connecting seat of the upper assembly may be pressed by adults or children accidentally, making the connecting seat move downwardly to drive the two upper rods of the upper assembly to rotate. The upper assembly may be folded to cause the user injury. Therefore, the safety of the conventional foldable enclosure apparatus is insufficient and needs to be improved.

To overcome the shortcomings, the present invention tends to provide a foldable enclosure apparatus having a locking device for a baby bed to mitigate or obviate the aforementioned problems.

SUMMARY OF THE INVENTION

The main objective of the invention is to provide a foldable enclosure apparatus having a locking device for a baby bed for enhancing the safety.

The foldable enclosure apparatus having a locking device for a baby bed has a hub device, four lower assemblies, four upper assemblies, and at least one locking device.

The lower assemblies are foldable, and are pivotally connected to and mounted around the hub device. Each lower assembly has a supporting rod and a supporting member. The supporting rod is disposed out of the hub device and has an inner surface. The supporting member is driven by the hub device and moveably mounted on the inner surface of the supporting rod of the supporting rod.

Each upper assembly is foldable and is mounted between two adjacent lower assemblies of the four lower assemblies. Each upper assembly has a connecting seat, a first rod, and a second rod. The connecting seat is disposed between the two adjacent lower assemblies. The first rod has a first end, a second end, and a first gear portion. The first end of the first rod is pivotally mounted on a corresponding one of the lower assemblies. The second end of the first rod is opposite first end of the first rod. The first gear portion is formed on the second end of the first rod and is pivotally mounted on the connecting seat. The second rod has a first end, a second end, and a second gear portion. The first end of the second rod is pivotally mounted on the corresponding one of the lower assemblies. The second end of the second rod is opposite the first end of the second rod. The second gear portion is formed on the second end of the second rod, is pivotally mounted on the connecting seat, and engages with the first gear portion of the first rod. At least one of the four upper assemblies has an assembly recess and two positioning grooves. The assembly recess is formed in the first gear portion of the first rod of the at least one upper assembly, the first gear portion having the assembly recess has two side surfaces and two elongated holes, and the elongated holes are respectively formed on the side surfaces of the first gear portion having the assembly recess and are in communication with the assembly recess. The positioning grooves are formed on the connecting seat of the at least one upper assembly and are located at two sides of the first gear portion of the at least one upper assembly, each positioning groove has a curved section and a transverse section, and the transverse section extends from a top end of the curved section and communicates with the elongated holes.

In a first embodiment of the foldable enclosure apparatus, each locking device has a lock member, a linking member, and a linking part. The lock member is restorably mounted in the first rod of the at least one upper assembly, is located in the assembly recess of the first rod of the at least one upper assembly, and has a locking rod. Two ends of the locking rod are inserted into the positioning grooves via the elongated holes respectively. The linking member is restorably mounted on the supporting rod connected to the first rod of the at least one upper assembly, is moveable upward and downward, and is located above the supporting member of the corresponding lower assembly. The linking part is connected with the lock member and the linking member. The linking part has a cable and a sleeve. The cable is connected with the lock member and the linking member. The sleeve is mounted around the cable.

In a second embodiment of the foldable enclosure apparatus, each one of the at least one locking device has a lock member and a linking part. The lock member is restorably mounted in the first rod of the at least one upper assembly, is located in the assembly recess of the first rod of the at least one upper assembly, and has a locking rod. Two ends of the locking rod are inserted into the positioning grooves via the elongated holes respectively. The linking part is connected with the lock member and the supporting member of the corresponding lower assembly. The linking part has a cable and a sleeve. The cable is connected with the lock member and the supporting member of the corresponding lower assembly. The sleeve is mounted around the cable.

When the foldable enclosure apparatus is unfolded, the locking rod of the at least one locking device is inserted into the transverse section of the positioning groove to lock the first gear portion and the second gear portion of the corresponding upper assembly. When the connecting seat of the corresponding upper assembly is pressed inadvertently by a user, the first rod and the second rod of the corresponding upper assembly would not rotate and fold, thereby avoiding pinching the user. When the foldable enclosure apparatus is to be folded, the hub device is pulled upward and the lower assemblies are folded. A top of the supporting member of each one of the lower assemblies moves downward for driving the linking part. The locking rod of the at least one locking device moves out of the transverse section of the positioning groove to unlock the upper assemblies. The relative rotation between the first gear portion and the second gear portion of each one of the upper assemblies is allowed. The locking rod may be moved along the curved section to fold the first rod and the second rod. Therefore, the folding of the upper assemblies driven by the accidental press is avoided by the at least one locking device. The safety of the foldable enclosure apparatus is enhanced.

In addition, when the lock member is driven by the linking member via the cable, the sleeve is mounted around the cable for protecting the cable. Interference with the cable is reduced. The motion of the cable is smooth.

Other objects, advantages and novel features of the invention will become more apparent from the following detailed description when taken in conjunction with the accompanying drawings.

DETAILED DESCRIPTION OF PREFERRED EMBODIMENT

Figure 1:
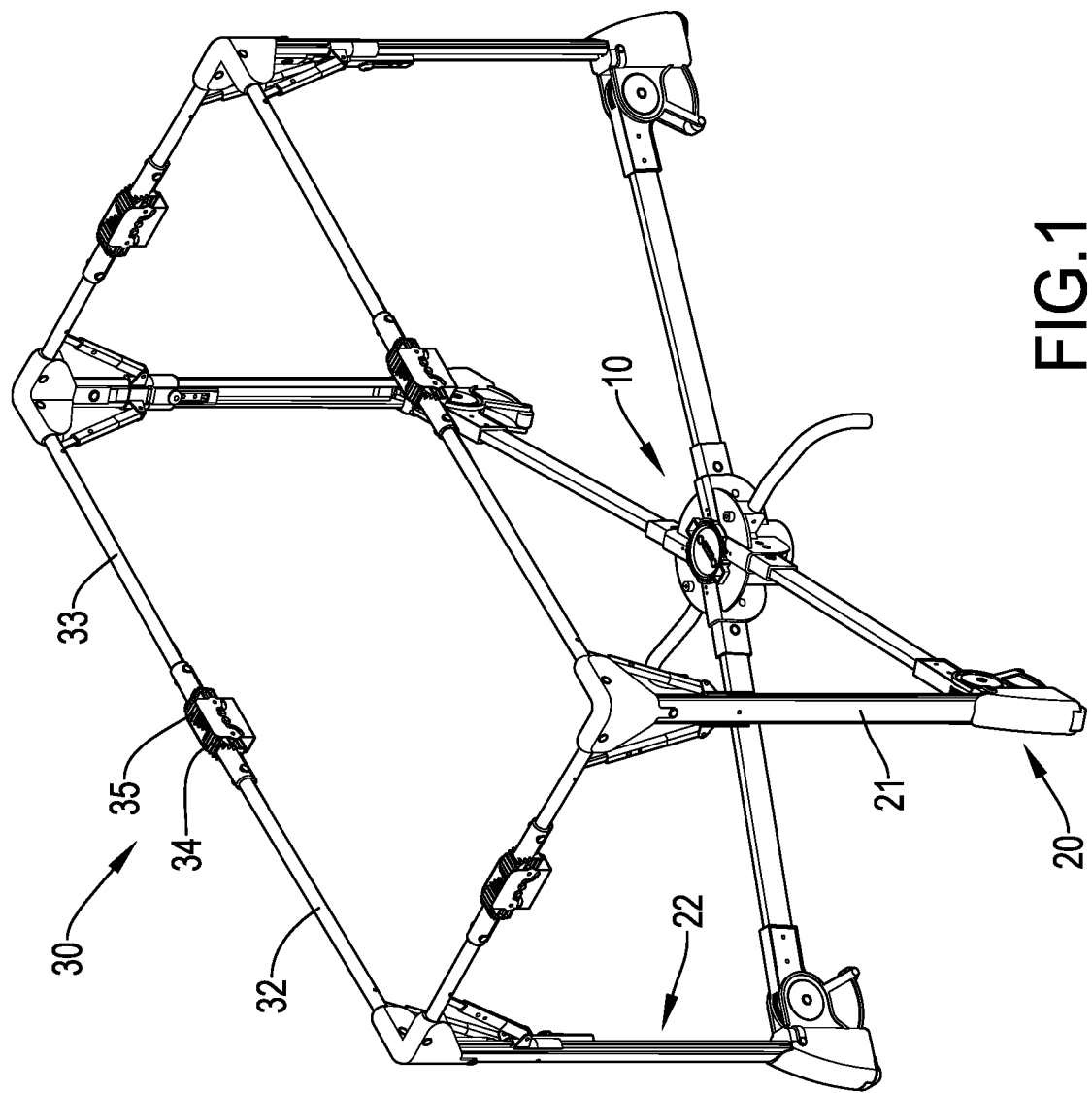
FIG. 1 is a perspective view of a first embodiment of a foldable enclosure apparatus having a locking device for a baby bed in accordance with the present invention under an unfolded condition.
Figure 2:
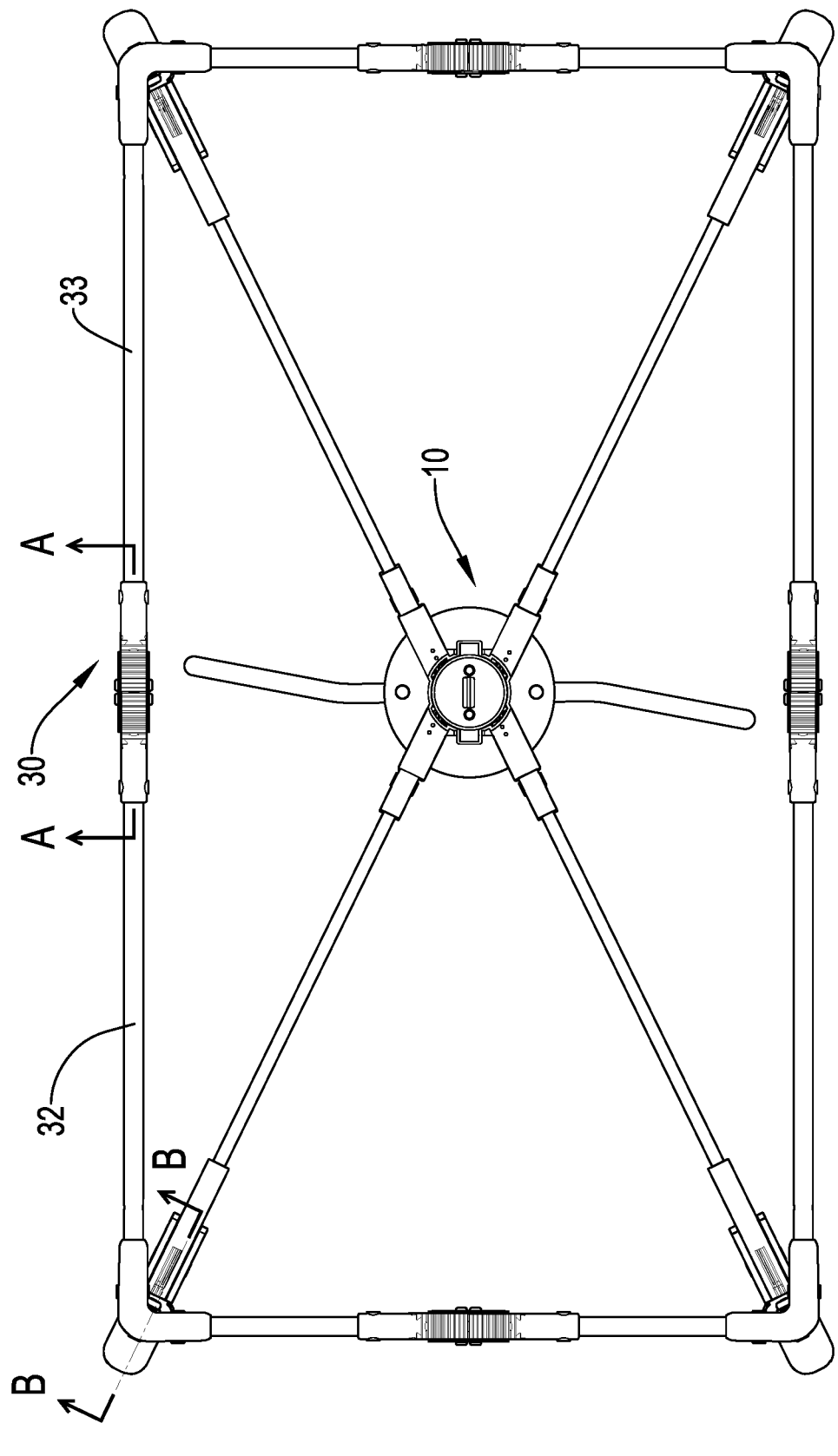
FIG. 2 is a top view of the foldable enclosure apparatus in FIG. 1.
Figure 3:
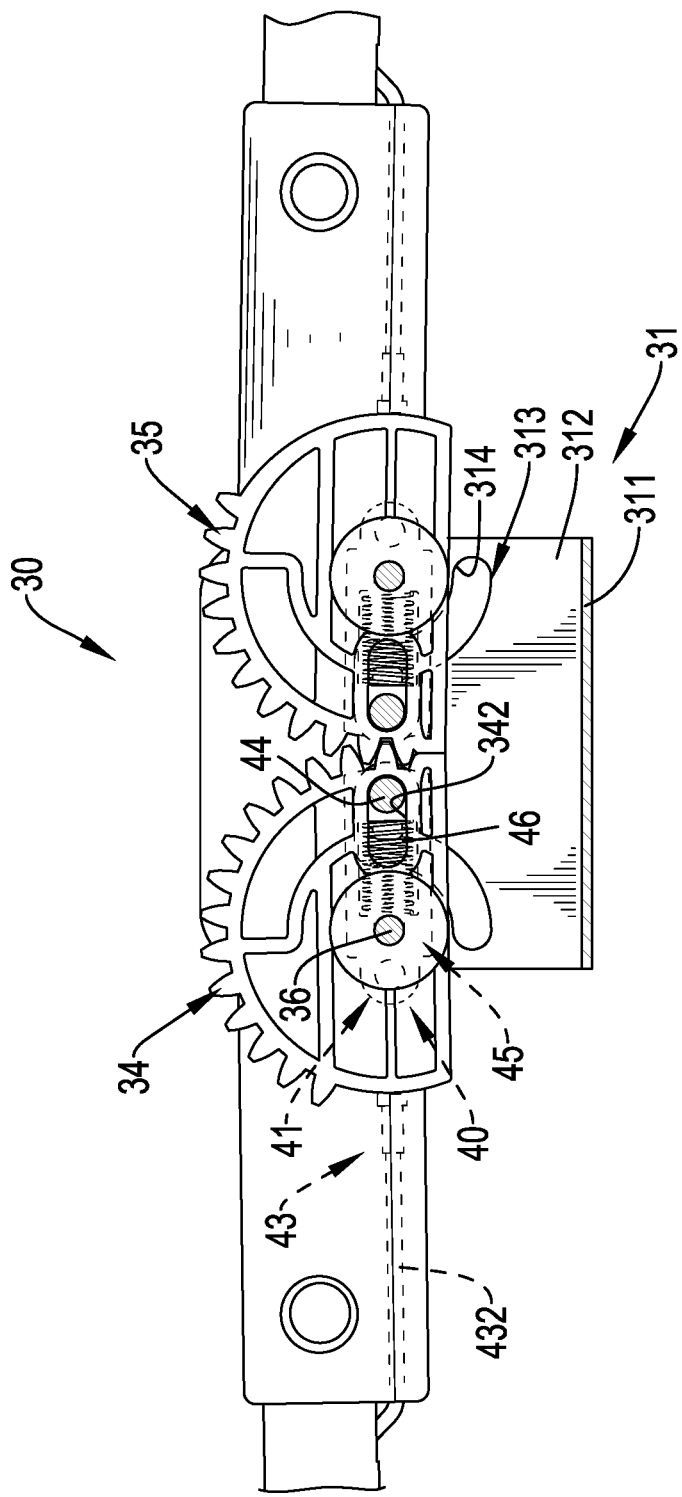
FIG. 3 is an enlarged side view in partial section of the foldable enclosure apparatus in FIG. 1.
Figure 5:
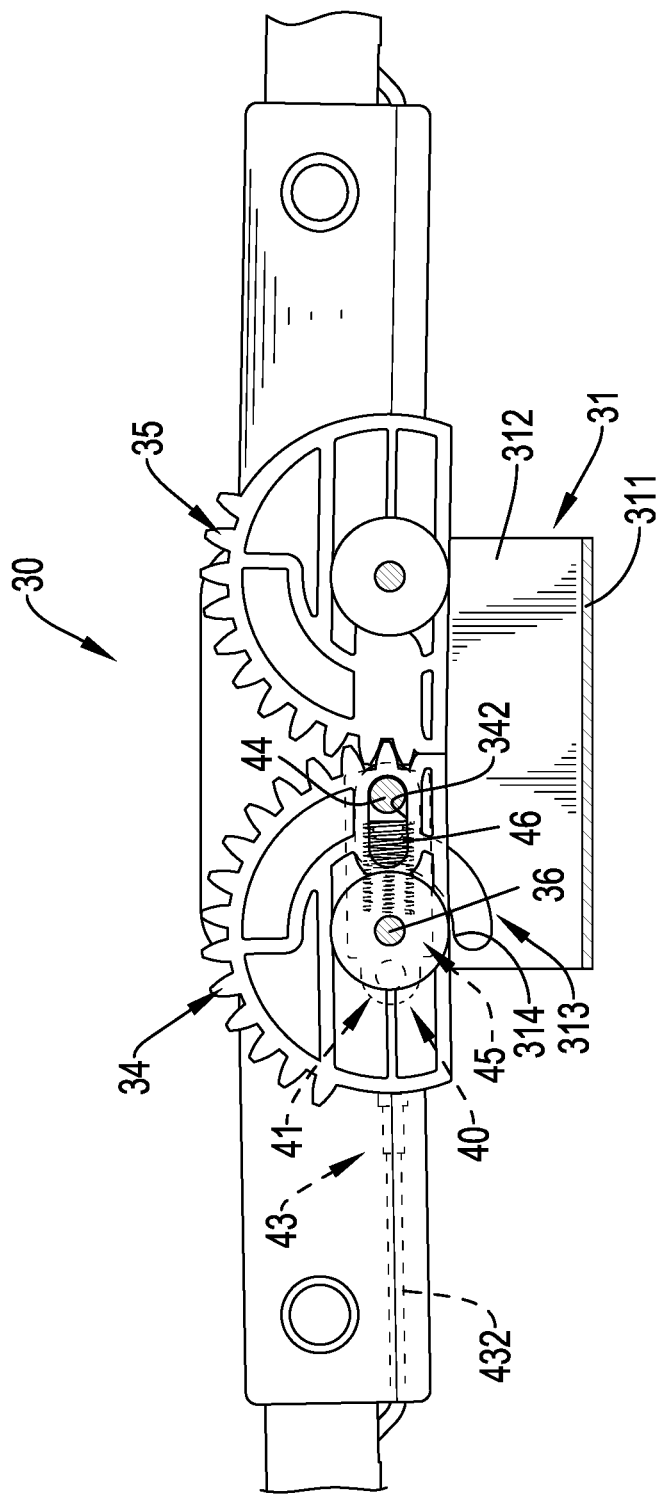
FIG. 5 is an enlarged side view in partial section of a second embodiment of a foldable enclosure apparatus having a locking device for a baby bed in accordance with the present invention.

With reference to FIGS. 1 to 3, and 5, a first embodiment of a foldable enclosure apparatus having a locking device for a baby bed in accordance with the present invention comprises a hub device 10, four lower assemblies 20, four upper assemblies 30, and at least one locking device 40. With reference to FIG. 3, in the first embodiment, the foldable enclosure apparatus has multiple locking devices 40. With reference to FIG. 5, in a second embodiment of the present invention, the foldable enclosure apparatus has a locking device 40.

The lower assemblies 20 are foldable, and are pivotally connected to and mounted around the hub device 10. Each lower assembly 20 has a supporting rod 21 and a supporting member 22. The supporting rod 21 is disposed out of the hub device 10 and has an inner surface. The supporting member 22 is driven by the hub device 10 and is moveably mounted on the inner surface of the supporting rod 21. With reference to FIG. 5, each supporting rod 21 has a retaining hole 23. The retaining hole 23 is formed in the inner side of the supporting rod 21.

Each supporting member 22 has a supporter 24, a first seat 25, a second seat 26, a retaining member 27, and a restoring element 28. The supporter 24 is moveably mounted in the inner side of the supporting rod 21 and is controlled by the hub device 10 to move upward and downward. The first seat 25 is fixed on a top of the supporter 24 and has an inner edge 251. The second seat 26 is moveably mounted on the supporting rod 21. The retaining member 27 is mounted on the second seat 26 and has a cone 271 and a retaining rod 272. The cone 271 is inserted into the first seat 25 and is connected to and below the inner edge 251 of the first seat 25. The retaining rod 272 is formed on the cone 271 and is inserted into the retaining hole 23 of the supporting rod 21. The restoring element 28 is mounted in the second seat 26 and has two ends. The two ends of the restoring element 28 are respectively connected to the second seat 26 and the retaining member 27.

With reference to FIGS. 1 and 2, each upper assembly 30 is foldable and is mounted between two adjacent lower assemblies 20 of the four lower assemblies 20. Each upper assembly 30 has a connecting seat 31, a first rod 32, and a second rod 33. The connecting seat 31 is disposed between the two adjacent lower assemblies 20 and has a bottom plate 311 and two side plates 312. The two side plates 312 are respectively formed on two sides of the bottom plate 311.

Figure 4:
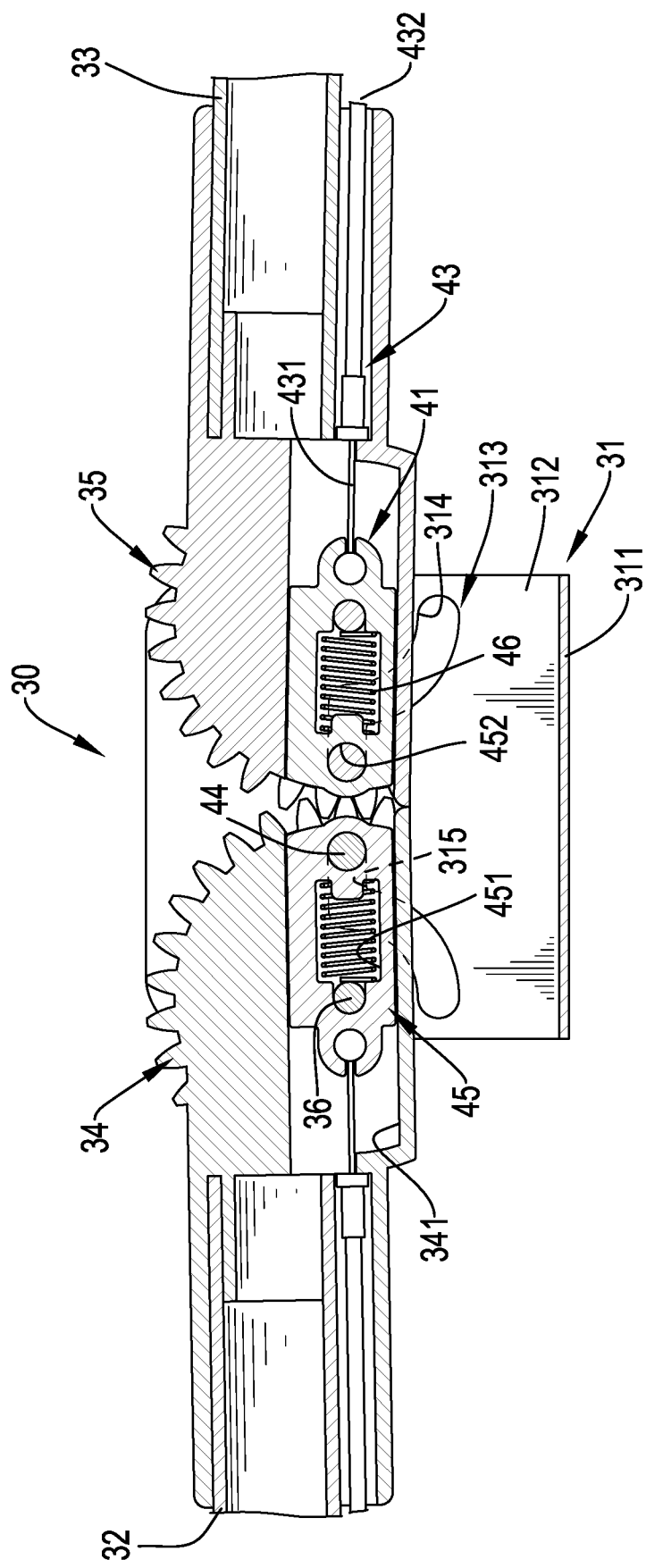
FIG. 4 is an enlarged cross sectional side view of the foldable enclosure apparatus along line 4-4 in FIG. 2.

With reference to FIGS. 3 to 5, the first rod 32 has a first end, a second end, and a first gear portion 34. The first end of the first rod 32 is pivotally mounted on the lower assembly 20. The second end of the first rod 32 is opposite the first end of the first rod 32. The first gear portion 34 is formed on the second end of the first rod 32 and is pivotally mounted on the connecting seat 31. The second rod 33 has a first end, a second end, and a second gear portion 35. The first end of the second rod 33 is pivotally mounted on the corresponding lower assembly 20. The second end of the second rod 33 is opposite the first end of the second rod 33. The second gear portion 35 is formed on the second end of the second rod 33, is pivotally mounted on the connecting seat 31, and engages with the first gear portion 34 of the first rod 32.

At least one of the four upper assemblies 30 has an assembly recess 341 and two positioning grooves 313. The assembly recess 341 is formed in the first gear portion 34 of the first rod 32 of the at least one upper assembly 30. The first gear portion 34 having the assembly recess 341 has two side surfaces and two elongated holes 342. The two elongated holes 342 are respectively formed in the two side surfaces of the first gear portion 34 having the assembly recess 341 and are in communication with the assembly recess 341. The positioning grooves 313 are formed on the connecting seat 31 of the at least one upper assembly 30 and are located at two sides of the first gear portion 34 of the at least one upper assembly 30. Each positioning groove 313 has a curved section 314 and a transverse section 315. The transverse section 315 extends from a top end of the curved section 314 and communicates with the elongated holes 342.

Figure 7:
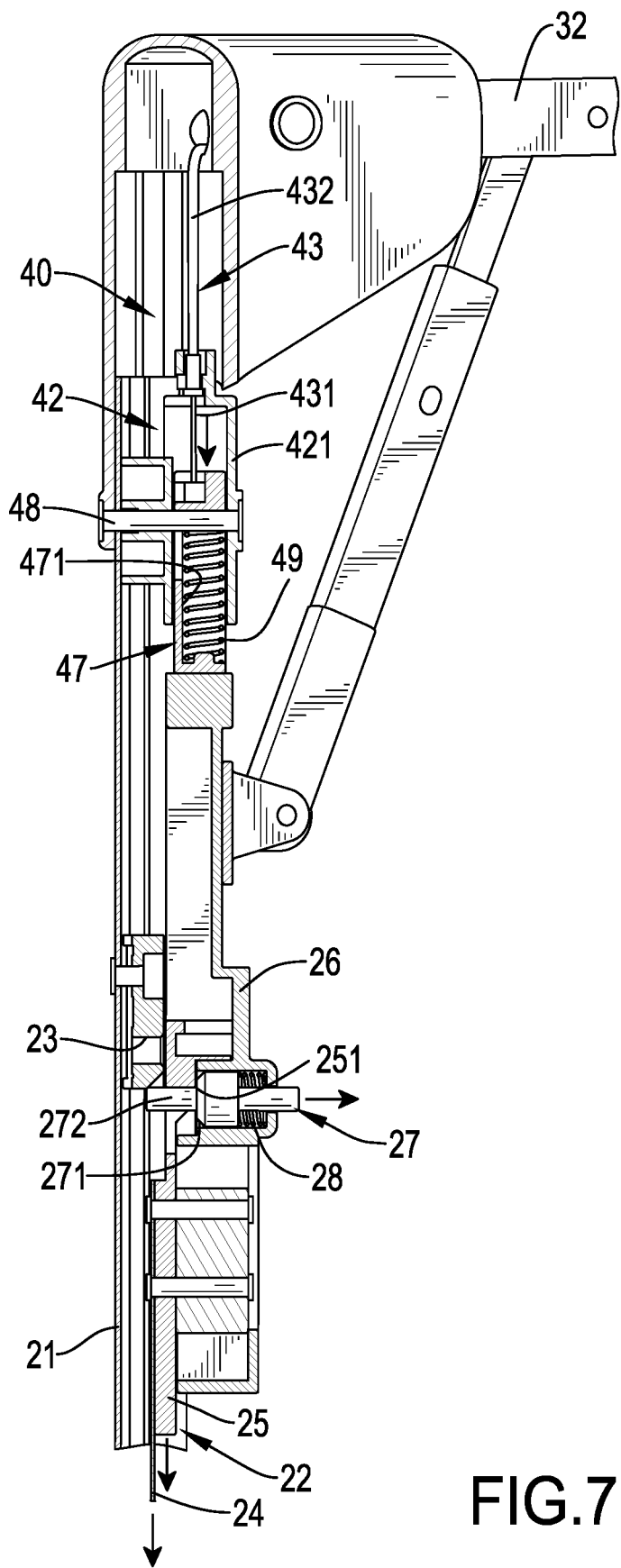
FIG. 7 is an operational and cross sectional side view of the foldable enclosure apparatus in FIG. 6, showing a linking member driven by a supporter.

With reference to FIGS. 4, 5, and 7, each locking device 40 has a lock member 41, a linking member 42, and a linking part 43. The lock member 41 is restorably mounted in the first rod 32 of the at least one upper assembly 30, is located in the assembly recess 341 of the first rod 32 of the at least one upper assembly 30, and has a locking rod 44. Two ends of the locking rod 44 are inserted into the positioning grooves 313 via the elongated holes 342 respectively. The linking member 42 is restorably mounted on the supporting rod 21 that is connected to the first rod 32 of the at least one upper assembly 30, is moveable upward and downward, and is located above the supporting member 22 of the corresponding lower assembly 20. The linking part 43 is connected with the lock member 41 and the linking member 42. The linking part 43 has a cable 431 and a sleeve 432. The cable 431 is connected with the lock member 41 and the linking member 42. The sleeve 432 is mounted around the cable 431.

With reference to FIGS. 3 and 4, the first rod 32 of the at least one upper assembly 30 has a shaft 36. The shaft 36 is inserted through the first gear portion 34 having the assembly recess and is connected to the connecting seat 31. Each one of the at least one locking device 40 has a locking seat 45, a first recess 451, a through hole 452, and a first spring 46. The locking seat 45 is located in the assembly recess 341. The first recess 451 is formed through the locking seat 45, wherein the shaft 36 is inserted through the first recess 451. The through hole 452 is formed through the locking seat 45 and is in communication with the elongated holes 342, wherein the locking rod 44 is inserted through the through hole 452. The first spring 46 is mounted in the first recess 451. Two ends of the first spring 46 are respectively connected to the shaft 36 and the locking seat 45.

Figure 6:
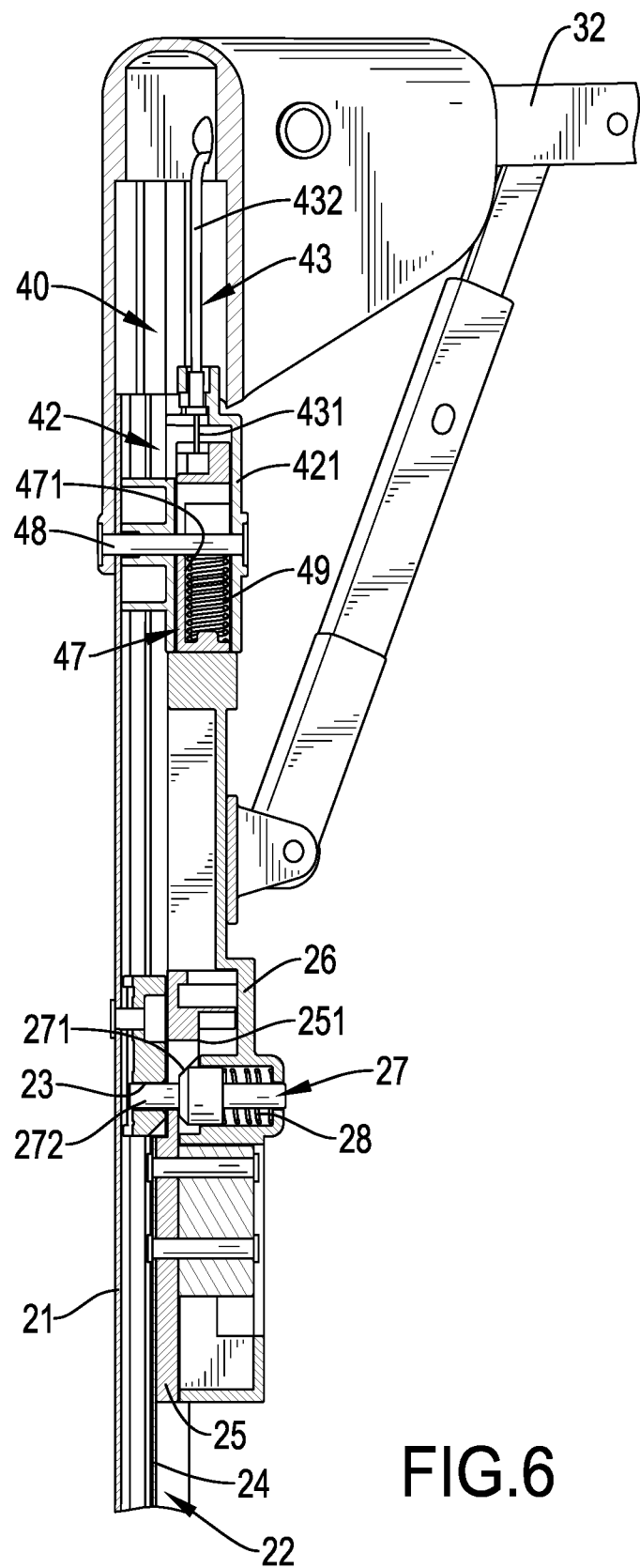
FIG. 6 is an enlarged cross sectional side view of the foldable enclosure apparatus along line 6-6 in FIG. 2.

With reference to FIG. 6, the linking member 42 of each one of the at least one locking member 40 has a fixing seat 421, a moving seat 47, a second recess 471, a fixing rod 48, and a second spring 49. The fixing seat 421 is mounted in the supporting rod 21 and is connected to the first rod 32 of the at least one upper assembly 30. The moving seat 47 is up-and-down moveably mounted on the fixing seat 421. The second recess 471 is formed in the moving seat 47. The fixing rod 48 is inserted through the fixing seat 421 and the second recess 471, and is fixed on the supporting rod 21.

The second spring 49 is compressibly mounted in the moving seat 47 and is located in the second recess 471. Two ends of the second spring 49 are respectively connected to the fixing rod 48 and the moving seat 47. In addition, an end of the sleeve 432 of the linking part 43 of the at least one locking device 40 is fixed on the fixing seat 421. The sleeve 432 is mounted through the supporting rod 21 and the first rod 32. Two ends of the cable 431 are respectively connected to the locking seat 45 and the moving seat 47.

Figure 10:
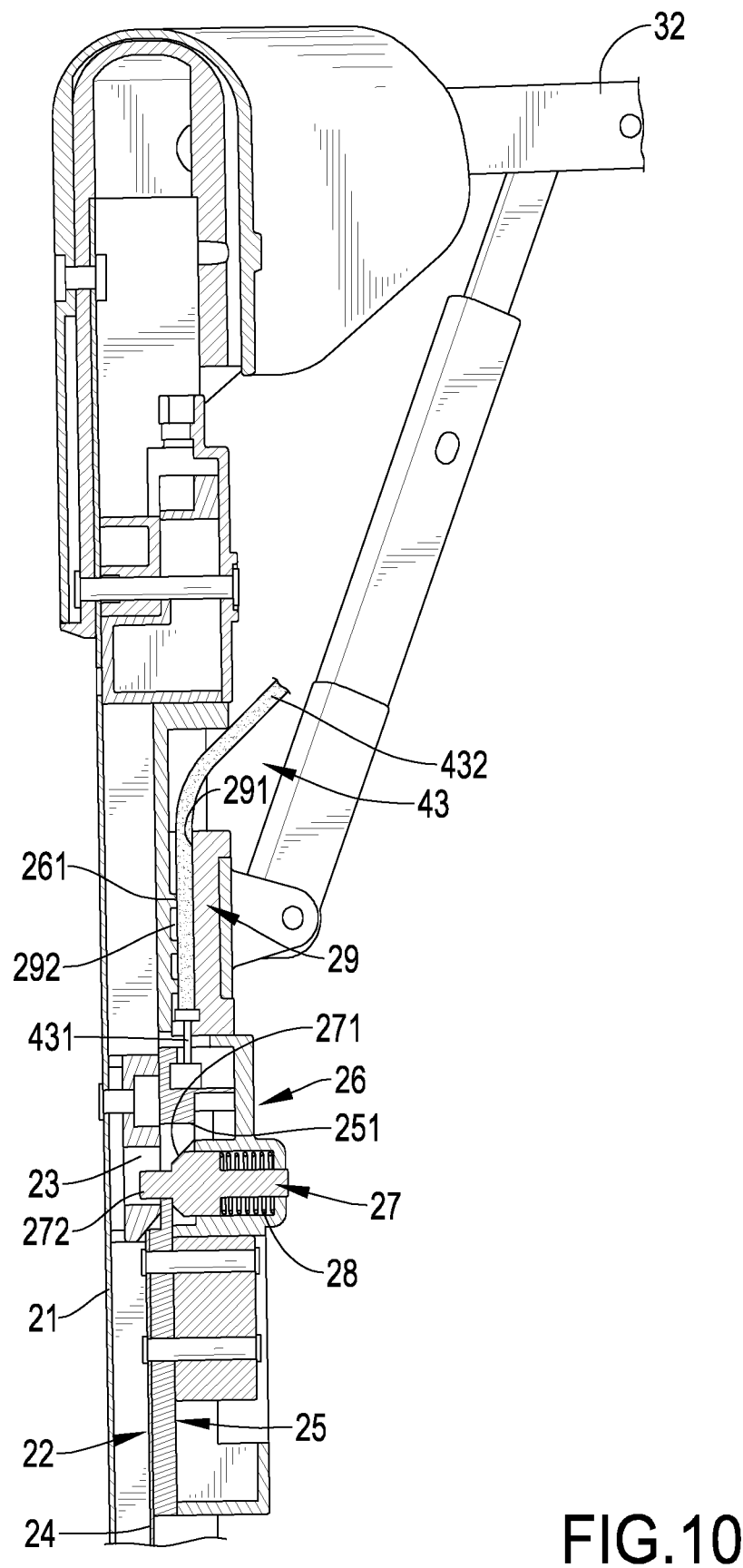
FIG. 10 is an enlarged and cross sectional side view of the foldable enclosure apparatus, showing a supporting member.
Figure 11:
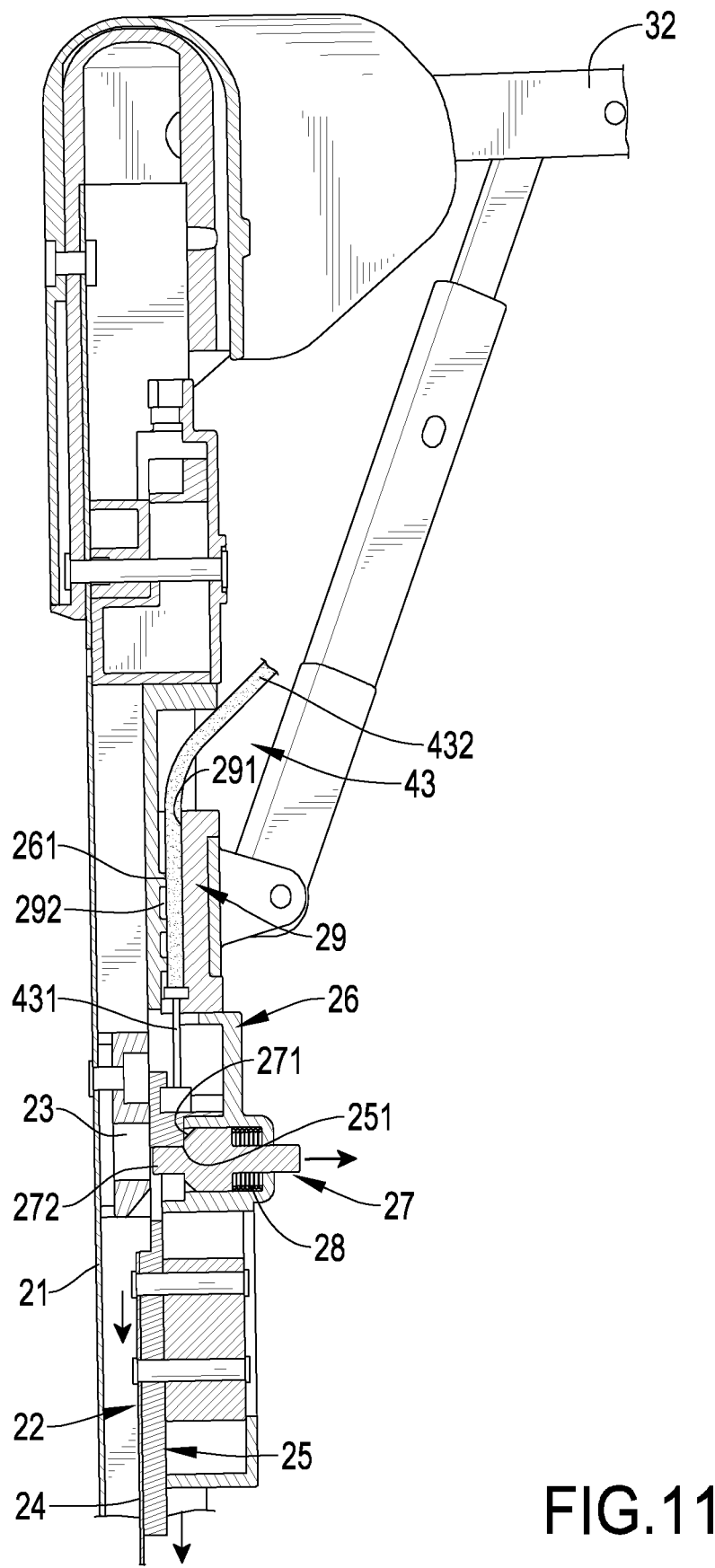
FIG. 11 is an operational and cross sectional side view of the foldable enclosure apparatus in FIG. 10.

With reference to FIGS. 10 and 11, a second embodiment of a foldable enclosure apparatus having a locking device for a baby bed in accordance with the present invention comprises at least one locking device 40. Each one of the at least one locking device 40 has a lock member 41 and a linking part 43. The lock member 41 is restorably mounted in the first rod 32 of the at least one upper assembly 30, is located in the assembly recess 341 of the first rod 32 of the at least one upper assembly 30, and has a locking rod 44. Two ends of the locking rod 44 are inserted into the positioning grooves 313 via the elongated holes 342 respectively. The linking part 43 is connected with the lock member 41 and the supporting member 22 of the corresponding lower assembly 20, and has a cable 431 and a sleeve 432. The cable 431 is connected with the lock member 41 and the supporting member 22 of the corresponding lower assembly 20. The sleeve 432 is mounted around the cable 431.

In addition, each supporting member 22 has a fixing block 29. The fixing block 29 is mounted on the second seat 26 and has an inner surface and a first fixing portion 292. The inner surface of the fixing block 29 has a containing groove 291. The first fixing portion 292 has protrusive and concave parts and is formed on the inner surface of the fixing block 29. The second seat 26 of each supporting member 22 has a second fixing portion 261. The second fixing portion 261 has protrusive and concave parts and engages with the first fixing portion 292. One end of the sleeve 432 of the linking part 43 of the at least one locking device 40 is mounted through the containing groove 291 and is fixed on the fixing block 29. The sleeve 432 is mounted through the supporting rod 21 and the first rod 32. The two ends of the cable 431 are respectively connected to the lock member 41 and the second seat 26.

With reference to FIGS. 3 and 4, when the foldable enclosure apparatus having a locking device for a baby bed is unfolded, the two ends of the locking rod 44 of the lock member 41 are respectively inserted into the transverse sections 315 of the positioning grooves 313 to lock the locking rod 44. The locking rod 44 cannot be rotated. The first gear portion 34 and the second gear portion 35 of each one of the upper assemblies 30 engage with each other and cannot be rotated, thereby locking the upper assemblies 30. When the connecting seat 31 of each one of the upper assemblies 30 is pressed inadvertently by a user, the upper assemblies 30 are locked. The first rod 32 and the second rod 33 of each one of the upper assemblies 30 cannot he rotated and folded, so as to avoid pinching the user.

During the folding process of the foldable enclosure apparatus, the hub device 10 is pulled upward for driving the lower assemblies 20 to fold. With reference to FIG. 7, in each lower assembly 20, the top of the supporter 24 moves downward for driving the first seat 25 to move downward. The inner edge 251 of the first seat 25 is connected to and pushes the cone 271 of the retaining member 27. The retaining rod 272 of the retaining member 27 moves out of the retaining hole 23 of the supporting rod 21 to release the locked state of the second seat 26. The second seat 26 moves downward with the first seat 25 and pulls the upper assemblies 30 to fold.

Figure 8:
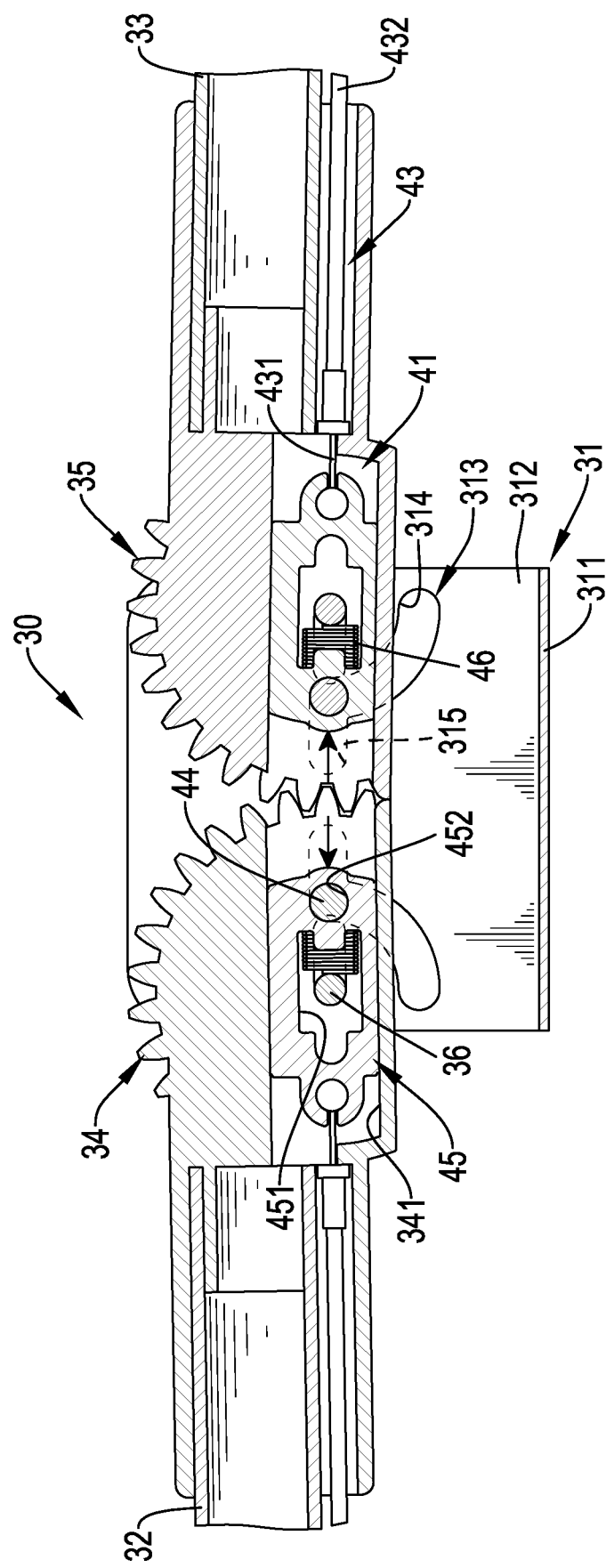
FIG. 8 is an operational and cross sectional side view of the foldable enclosure apparatus in FIG. 5, showing an unlocked state of a locking device.
Figure 9:
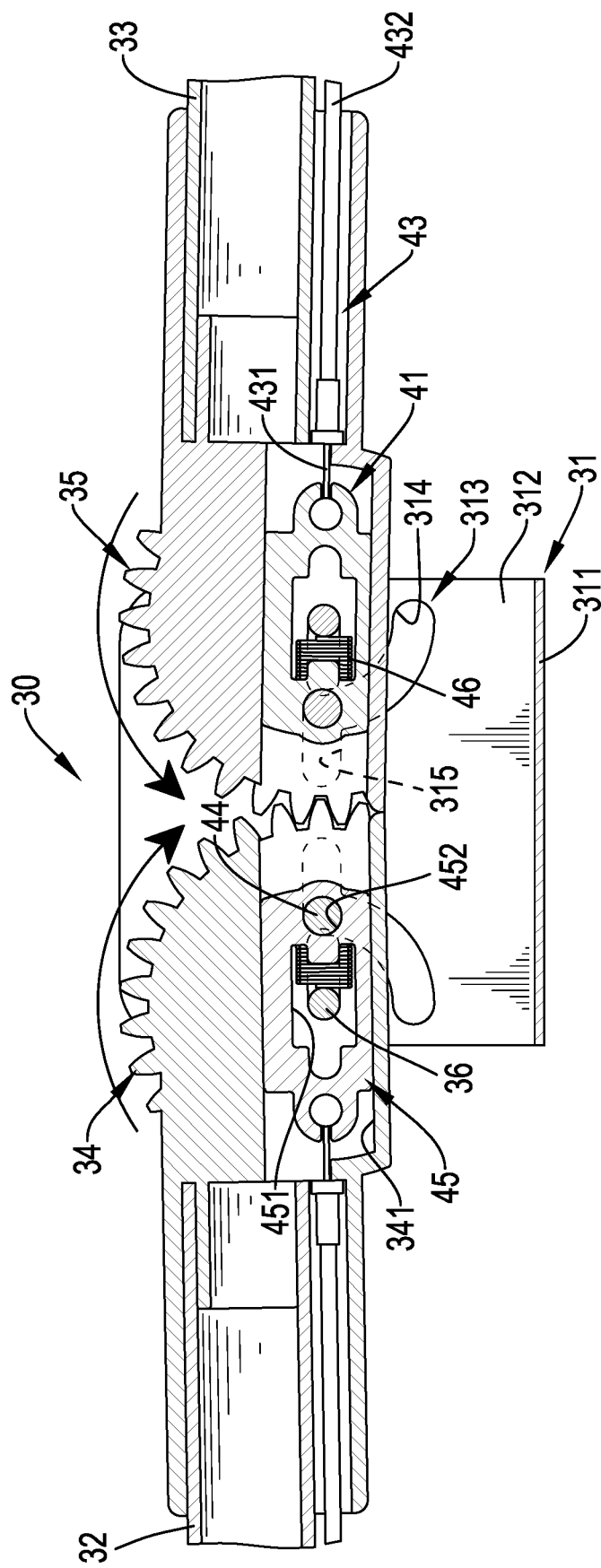
FIG. 9 is an operational and cross sectional side view of the foldable enclosure apparatus in FIG. 5, showing a relative rotation between a first gear portion and a second gear portion.

When the first seat 25 moves downward, the second spring 49 of the at least one locking device 40 exerts a restoring force to the moving seat 47 to pull the cable 431 of the linking part 43. With reference to FIGS. 8 and 9, the locking seat 45 is pulled by the linking part 43 for driving the locking rod 44. The two ends of the locking rod 44 respectively move out of the transverse sections 315 of the positioning grooves 313, and further move into the curved sections 314 of the positioning grooves 313 to release the locked state of the upper assemblies 30. The relative rotation between the first gear portion 34 and the second gear portion 35 is allowed. The upper assemblies 30 are pulled by the second seat 26 to smoothly fold the first rod 32 and the second rod 33 of each upper assembly 30.

With reference to FIG. 11, when the foldable enclosure apparatus having a locking device for a baby bed is folded, the top of the supporter 24 moves downward for driving the first seat 25 to move downward. The inner edge 251 of the first seat 25 is connected to and pushes the cone 271 of the retaining member 27. The retaining rod 272 of the retaining member 27 moves out of the retaining hole 23 of the supporting rod 21 to release the locked state of the second seat 26. The second seat 26 moves downward with the first seat 25 to pull the upper assemblies 30 to fold. When the first seat 25 moves downward, the cable 431 is pulled downward by the first seat 25. The locking seat 45 is pulled by the linking part 43 to release the locked state of the upper assemblies 30.

Accordingly, during the unfolding process of the foldable enclosure apparatus, the upper assemblies 30 are locked by the at least one locking device 40. The relative rotation between the first gear portion 34 and the second gear portion 35 of each one of the upper assemblies 30 is not allowed. When the connecting seat 31 of the corresponding upper assembly 30 is pressed inadvertently by a user, the first rod 32 and the second rod 33 of the corresponding upper assembly 30 would not rotate and fold, so as to avoid pinching the user and folding the foldable enclosure apparatus. The safety of the foldable enclosure apparatus is increased. During the folding process of the foldable enclosure apparatus, the at least one locking device 40 is driven by the motion of the supporting member 22 to release the locked state of the upper assemblies 30 and to fold the upper assemblies 30. The operation of the foldable enclosure apparatus is easy and smooth.

In addition, when the lock member 41 is driven by the linking member 42 via the cable 431, the sleeve 432 is mounted around the cable 431 for protecting the cable 431. Interference with the cable 431 is reduced. The motion of the cable 431 is smooth.

What is claimed is:

1. A foldable enclosure apparatus having a locking device for a baby bed comprising:
    a hub device;
    four lower assemblies being foldable, pivotally connected to and mounted around the hub device, and each lower assembly having
        a supporting rod disposed out of the hub device and having an inner surface; and
        a supporting member moveably mounted on the inner surface of the supporting rod;
    four upper assemblies, each upper assembly being foldable and mounted between two adjacent lower assemblies of the four lower assemblies, and each upper assembly having
        a connecting seat disposed between the two adjacent lower assemblies;
        a first rod having
            a first end pivotally mounted on a corresponding one of the lower assemblies;
            a second end opposite the first end of the first rod;
            a first gear portion formed on the second end of the first rod and pivotally mounted on the connecting seat;
        a second rod having
            a first end pivotally mounted on the corresponding one of the lower assemblies;
            a second end opposite the first end of the second rod;
            a second gear portion formed on the second end of the second rod, pivotally mounted on the connecting seat, and engaging with the first gear portion of the first rod;
    wherein at least one of the four upper assemblies has an assembly recess and two positioning grooves, the assembly recess is formed in the first gear portion of the first rod of the at least one upper assembly, the first gear portion having the assembly recess has two side surfaces and two elongated holes, the elongated holes are respectively formed on the side surfaces of the first gear portion having the assembly recess and are in communication with the assembly recess, the positioning grooves are formed on the connecting seat of the at least one upper assembly and are located at two sides of the first gear portion of the at least one upper assembly, each positioning groove has a curved section and a transverse section, and the transverse section extends from a top end of the curved section and communicates with the elongated holes; and
    at least one locking device, each locking device having
        a lock member restorably mounted in the first rod of the at least one upper assembly, located in the assembly recess of the first rod of the at least one upper assembly, and having
            a locking rod having
                two ends inserted into the positioning grooves via the elongated holes respectively;
        a linking member restorably mounted on the supporting rod connected to the first rod of the at least one upper assembly, being up-and-down moveable, and located above the supporting member of the corresponding lower assembly; and
        a linking part connected with the lock member and the linking member, and having
            a cable connected with the lock member and the linking member; and
            a sleeve mounted around the cable.

2. The foldable enclosure apparatus having a locking device for a baby bed as claimed in claim 1, wherein
    the first rod of the at least one upper assembly has
        a shaft inserted through the first gear portion that has the assembly recess, the shaft connected to the connecting seat; and
    each one of the at least one locking device has
        a locking seat located in the assembly recess;
        a first recess formed through the locking seat, wherein the shaft is inserted through the first recess;
        a through hole formed through the locking seat and communicating with the elongated holes, wherein the locking rod is inserted through the through hole; and
        a first spring mounted in the first recess and having two ends respectively connected to the shaft and the locking seat.

3. The foldable enclosure apparatus having a locking device for a baby bed as claimed in claim 2, wherein
    the linking member of each one of the at least one locking member has
        a fixing seat mounted in the supporting rod connected to the first rod of the at least one upper assembly;
        a moving seat up-and-down moveably mounted on the fixing seat;
        a second recess formed in the moving seat;
        a fixing rod inserted through the fixing seat and the second recess, and fixed on the supporting rod; and
        a second spring compressibly mounted in the moving seat and located in the second recess, and having two ends respectively connected to the fixing rod and the moving seat.

4. The foldable enclosure apparatus having a locking device for a baby bed as claimed in claim 3, wherein an end of the sleeve of the linking part of the at least one locking device is fixed on the fixing seat, the sleeve connects through the supporting rod and the first rod, and two ends of the cable are respectively connected to the locking seat and the moving seat.

5. The foldable enclosure apparatus having a locking device for a baby bed as claimed in claim 4, wherein
each supporting rod has
an inner side; and
a retaining hole formed in the inner side of the supporting rod; and
each supporting member has
a supporter moveably mounted in the inner side of the supporting rod and controlled by the hub device;
a first seat fixed on a top of the supporter and having an inner edge;
a second seat moveably mounted on the supporting rod;
a retaining member mounted on the second seat and having
a cone inserted into the first seat and connected to and below the inner edge of the first seat;
a retaining rod formed on the cone and inserted into the retaining hole of the supporting rod; and
a restoring element mounted in the second seat and having
two ends respectively connected to the second seat and the retaining member.

6. The foldable enclosure apparatus having a locking device for a baby bed as claimed in claim 2, wherein
each supporting rod has
an inner side; and
a retaining hole formed in the inner side of the supporting rod; and
each supporting member has
a supporter moveably mounted in the inner side of the supporting rod and controlled by the hub device;
a first seat fixed on a top of the supporter and having an inner edge;
a second seat moveably mounted on the supporting rod;
a retaining member mounted on the second seat and having
a cone inserted into the first seat and connected to and below the inner edge of the first seat; and
a retaining rod formed on the cone and inserted into the retaining hole of the supporting rod; and
a restoring element mounted in the second seat and having
two ends respectively connected to the second seat and the retaining member.

7. The foldable enclosure apparatus having a locking device for a baby bed as claimed in claim 3, wherein
each supporting rod has
an inner side; and
a retaining hole formed in the inner side of the supporting rod; and
each supporting member has
a supporter moveably mounted in the inner side of the supporting rod and controlled by the hub device;
a first seat fixed on a top of the supporter and having an inner edge;
a second seat moveably mounted on the supporting rod;
a retaining member mounted on the second seat and having
a cone inserted into the first seat and connected to and below the inner edge of the first seat; and
a retaining rod formed on the cone and inserted into the retaining hole of the supporting rod; and
a restoring element mounted in the second seat and having
two ends respectively connected to the second seat and the retaining member.

8. The foldable enclosure apparatus having a locking device for a baby bed as claimed in claim 1, wherein
the linking member of each one of the at least one locking member has
a fixing seat mounted in the supporting rod connected to the first rod of the at least one upper assembly;
a moving seat up-and-down moveably mounted on the fixing seat;
a second recess formed in the moving seat;
a fixing rod inserted through the fixing seat and the second recess, and fixed on the supporting rod; and
a spring compressibly mounted in the moving seat and located in the second recess, and having
two ends respectively connected to the fixing rod and the moving seat.

9. The foldable enclosure apparatus having a locking device for a baby bed as claimed in claim 8, wherein an end of the sleeve of the linking part of the at least one locking device is fixed on the fixing seat, the sleeve connects through the supporting rod and the first rod, and two ends of the cable are respectively connected to the locking seat and the moving seat.

10. The foldable enclosure apparatus having a locking device for a baby bed as claimed in claim 9, wherein
each supporting rod has
an inner side; and
a retaining hole formed in the inner side of the supporting rod; and
each supporting member has
a supporter moveably mounted in the inner side of the supporting rod and controlled by the hub device;
a first seat fixed on a top of the supporter and having an inner edge;
a second seat moveably mounted on the supporting rod;
a retaining member mounted on the second seat and having
a cone inserted into the first seat and connected to and below the inner edge of the first seat; and
a retaining rod formed on the cone and inserted into the retaining hole of the supporting rod; and
a restoring element mounted in the second seat and having
two ends respectively connected to the second seat and the retaining member.

11. The foldable enclosure apparatus having a locking device for a baby bed as claimed in claim 8, wherein
each supporting rod has
an inner side; and
a retaining hole formed in the inner side of the supporting rod; and
each supporting member has
a supporter moveably mounted in the inner side of the supporting rod and controlled by the hub device;
a first seat fixed on a top of the supporter and having an inner edge;
a second seat moveably mounted on the supporting rod;
a retaining member mounted on the second seat and having
a cone inserted into the first seat and connected to and below the inner edge of the first seat; and
a retaining rod formed on the cone and inserted into the retaining hole of the supporting rod; and
a restoring element mounted in the second seat and having
two ends respectively connected to the second seat and the retaining member.

12. The foldable enclosure apparatus having a locking device for a baby bed as claimed in claim 1, wherein
each supporting rod has
an inner side; and
a retaining hole formed in the inner side of the supporting rod; and
each supporting member has
a supporter moveably mounted in the inner side of the supporting rod and controlled by the hub device;
a first seat fixed on a top of the supporter and having an inner edge;
a second seat moveably mounted on the supporting rod;
a retaining member mounted on the second seat and having
a cone inserted into the first seat and connected to and below the inner edge of the first seat; and
a retaining rod formed on the cone and inserted into the retaining hole of the supporting rod; and
a restoring element mounted in the second seat and having
two ends respectively connected to the second seat and the retaining member.

13. A foldable enclosure apparatus having a locking device for a baby bed comprising:
a hub device;
four lower assemblies being foldable, and pivotally connected to and mounted around the hub device, and each lower assembly having
a supporting rod disposed out of the hub device and having an inner surface; and
a supporting member moveably mounted on the inner surface of the supporting rod
four upper assemblies, each upper assembly being foldable and mounted between two adjacent lower assemblies of the four lower assemblies, and each upper assembly having
a connecting seat disposed between the two adjacent lower assemblies;
a first rod having
a first end pivotally mounted on a corresponding one of the lower assemblies;
a second end opposite the first end of the first rod;
a first gear portion formed on the second end of the first rod and pivotally mounted on the connecting seat;
a second rod having
a first end pivotally mounted on the corresponding one of the lower assemblies;
a second end opposite the first end of the second rod;
a second gear portion formed on the second end of the second rod, pivotally mounted on the connecting seat, and engaging with the first gear portion of the first rod;
wherein at least one of the four upper assemblies has an assembly recess and two positioning grooves, the assembly recess is formed in the first gear portion of the first rod of the at least one upper assembly, the first gear portion having the assembly recess has two side surfaces and two elongated holes, the elongated holes are respectively formed in the side surfaces of the first gear portion having the assembly recess and are in communication with the assembly recess, the positioning grooves are formed on the connecting seat of the at least one upper assembly and are located at two sides of the first gear portion of the at least one upper assembly, each positioning groove has a curved section and a transverse section, and the transverse section extends from a top end of the curved section and communicates with the elongated holes; and
at least one locking device, each one of the at least one locking device having
a lock member restorably mounted in the first rod of the at least one upper assembly, located in the assembly recess of the first rod of the at least one upper assembly, and having
a locking rod having
two ends of the locking rod inserted into the positioning grooves via the elongated holes respectively;
a linking part connected with the lock member and the supporting member of the corresponding lower assembly, and having
a cable connected with the lock member and the supporting member of the corresponding lower assembly; and
a sleeve mounted around the cable.

14. The foldable enclosure apparatus having a locking device for a baby bed as claimed in claim 13, wherein
the first rod of the at least one upper assembly has
a shaft inserted through the first gear portion that has the assembly recess, the shaft connected to the connecting seat; and
each one of the at least one locking device has
a locking seat located in the assembly recess;
a first recess formed through the locking seat, wherein the shaft is inserted through the first recess;
a through hole formed through the locking seat and communicating with the elongated holes, wherein the locking rod is inserted through the through hole; and
a first spring mounted in the first recess and having
two ends respectively connected to the shaft and the locking seat.

15. The foldable enclosure apparatus having a locking device for a baby bed as claimed in claim 14, wherein
each supporting rod has
an inner side;
a retaining hole formed in the inner side; and
each supporting member has
a supporter moveably mounted in the inner side and controlled by the hub device;
a first seat fixed on a top of the supporter and having an inner edge;
a second seat moveably mounted on the supporting rod;
a retaining member mounted on the second seat and having
a cone inserted into the first seat and connected to and below the inner edge of the first seat;
a retaining rod formed on the cone and inserted into the retaining hole of the supporting rod; and
a restoring element mounted in the second seat and having
two ends respectively connected to the second seat and the retaining member.

16. The foldable enclosure apparatus having a locking device for a baby bed as claimed in claim 15, wherein
each supporting member has
a fixing block mounted on the second seat and having an inner surface having a containing groove; and
a first fixing portion having protrusive and concave parts and formed on the inner surface of the fixing block; and
the second seat of each supporting member has a second fixing portion having protrusive and concave parts that are engaged with the first fixing portion.

17. The foldable enclosure apparatus having a locking device for a baby bed as claimed in claim 16, wherein one end of the sleeve of the linking part of the at least one locking device is mounted through the containing groove and is fixed on the fixing block, and the sleeve is mounted through the supporting rod and the first rod, and two ends of the cable are respectively connected to the lock member and the second seat.

18. The foldable enclosure apparatus having a locking device for a baby bed as claimed in claim 13, wherein
each supporting rod has
an inner side;
a retaining hole formed in the inner side; and
each supporting member has
a supporter moveably mounted in the inner side and controlled by the hub device;
a first seat fixed on a top of the supporter and having an inner edge;
a second seat moveably mounted on the supporting rod;
a retaining member mounted on the second seat and having
a cone inserted into the first seat and connected to and below the inner edge of the first seat;
a retaining rod formed on the cone and inserted into the retaining hole of the supporting rod; and
a restoring element mounted in the second seat and having
two ends respectively connected to the second seat and the retaining member.

19. The foldable enclosure apparatus having a locking device for a baby bed as claimed in claim 18, wherein
each supporting member has
a fixing block mounted on the second seat and having an inner surface having a containing groove; and
a first fixing portion having protrusive and concave parts and formed on the inner surface of the fixing block; and
the second seat of each supporting member has
a second fixing portion having protrusive and concave parts that are engaged with the first fixing portion.

20. The foldable enclosure apparatus having a locking device for a baby bed as claimed in claim 19, wherein one end of the sleeve of the linking part of the at least one locking device is mounted through the containing groove and is fixed on the fixing block, and the sleeve is mounted through the supporting rod and the first rod, and two ends of the cable are respectively connected to the lock member and the second seat.

* * * * *